United States Patent [19]
Touchstone

[11] 3,835,969
[45] Sept. 17, 1974

[54] QUICK SLACK ADJUSTER FOR LOCOMOTIVE BRAKES

[76] Inventor: Roy H. Touchstone, P.O. Box 2003, Jackson, Tenn. 30801

[22] Filed: Nov. 27, 1972

[21] Appl. No.: 309,683

[52] U.S. Cl. ............................... 188/197, 74/522
[51] Int. Cl. ............................................ F16d 65/44
[58] Field of Search....... 74/522; 188/196 M, 196 S, 188/197

[56] References Cited
UNITED STATES PATENTS

| | | | |
|---|---|---|---|
| 935,176 | 9/1909 | Thompson | 188/197 |
| 1,751,661 | 3/1930 | Schaefer | 188/197 UX |
| 2,381,212 | 8/1945 | Farmer | 188/197 |
| 2,546,753 | 3/1951 | Johnson | 188/197 X |
| 2,920,501 | 1/1960 | Couch | 188/197 X |

Primary Examiner—Duane A. Reger
Attorney, Agent, or Firm—Head & Johnson

[57] ABSTRACT

A brake adjustment device for locomotives wherein slack in the brake mechanism may be quickly and easily adjusted, and the brake shoes may be quickly removed and replaced when they have become sufficiently worn, or are otherwise damaged or in need of repair. The adjustment device includes an apertured slide bar connected with the brake lever of a locomotive wheel and extending through a housing secured to the brake lever of an adjacent or in line locomotive wheel whereby the adjuster may be utilized in much the same manner as a turnbuckle for quickly adjusting the brakes. In addition, the slide bar device facilitates release of the brake lever to provide for a quick clearance between the brake shoe and wheel, thus reducing the time required for the replacement of worn brake shoes.

5 Claims, 6 Drawing Figures

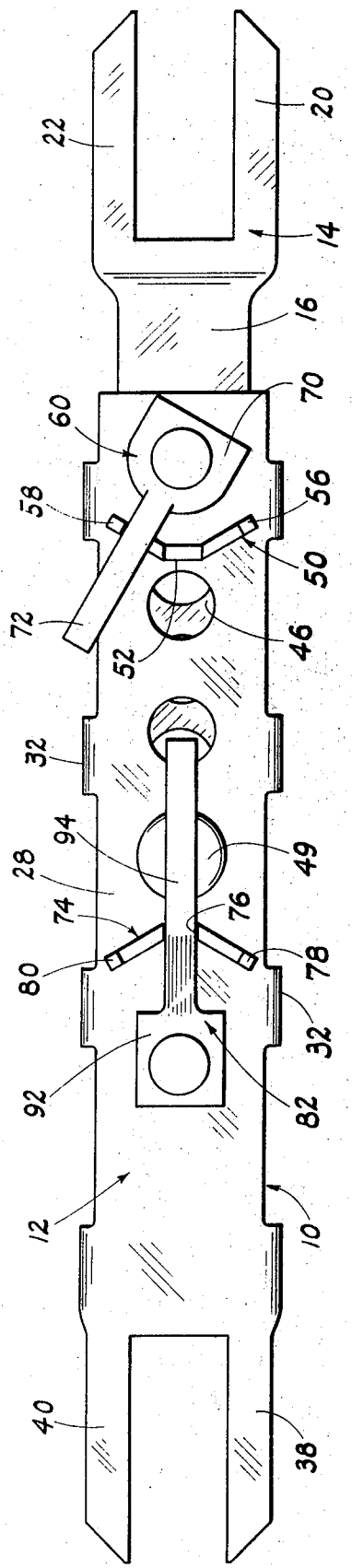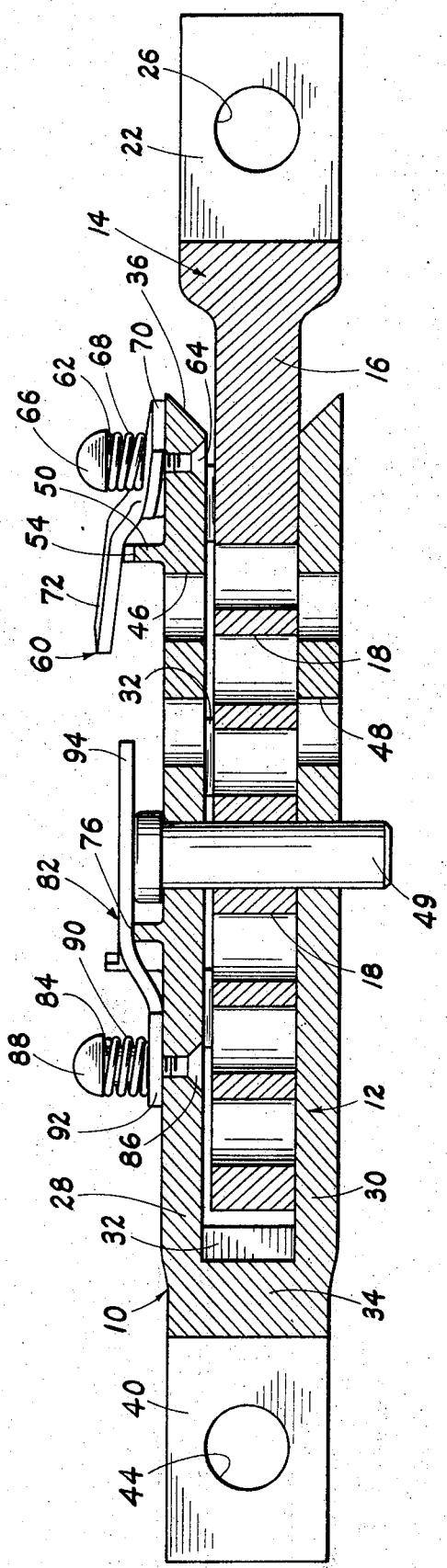
Fig. 1
Fig. 2

QUICK SLACK ADJUSTER FOR LOCOMOTIVE BRAKES

CROSS-REFERENCES TO RELATED APPLICATIONS

This application is an improvement over my co-pending application Ser. No. 184,798, filed Sept. 29, 1971, and entitled "Quick Slack Adjuster for Locomotive Brakes," and relates to a slack adjuster for use in connection with a different type of locomotive brake arrangement.

BACKGROUND OF THE INVENTION

1. Field of the Invention

This invention relates to improvements in brake adjustment devices for locomotives and more particularly, but not by way of limitation, to a quick slack adjuster device for locomotive brakes.

2. Description of the Prior Art

Locomotives, and particularly diesel locomotives, are normally provided with friction type brake shoes engagable with the outer periphery of the locomotive wheels for slowing or braking the speed thereof. The brake shoes wear relatively rapidly and it becomes necessary to adjust the slack due to the wear thereof in order to maintain an efficient braking operation. Screw type slack adjusters are in widespread use today for adjusting the locomotive brakes. However, these devices are not only expensive but also require a great amount of time for adjusting the slack in the brake system, and are particularly time consuming when it is necessary to replace worn brake shoes. For example, it requires approximately thirty minutes to one hour to screw the adjustment device out and screw it back in. This is a great disadvantage, particularly when it is considered that it is usually necessary to renew brake shoes relatively frequently. In addition, the screw type adjustment devices require lubricating or greasing about once a month, which is an added expense and a time consuming matter.

In an effort to overcome the disadvantages of the screw type adjusting devices, a sliding type adjuster was developed as shown in the W. H. Nolan et al, U.S. Pat. No. 3,527,325, issued Sept. 8, 1970, and entitled "Slack Adjuster." This device has certain disadvantages, however, in that the cylindrical sliding member may turn or rotate within the cylindrical sleeve, and it is extremely difficult to reorientate the apertures of the sliding member with the sleeve through which it passes.

In order to overcome these disadvantages, a slide bar type brake adjusting apparatus has been developed as shown in my prior U.S. Pat. No. 3,613,840, issued Oct. 19, 1971, and entitled "Quick Slack Adjuster for Locomotive Brakes," and as shown in my aforementioned co-pending application. These devices include a slide bar having one end connected with a brake lever and extending non-rotatably but slidably through a trunnion which is carried by the usual pull rods provided on the locomotive brake apparatus. The devices have been very successful, but it has been found that these structures are not readily useable in connection with locomotive six wheel trucks.

The locomotive six wheel trucks normally comprises three independent pairs of axially aligned wheels, with each pair of axially aligned wheels being longitudinally aligned in a manner for following one another along a train track, or the like, as is well known. Usually, two adjacent pairs of the axially aligned wheels are provided with respective brake levers interposed between the adjacent longitudinally aligned wheels thereof and interconnected in a manner whereby the brake levers may be selectively repositioned. The third pair of axially aligned wheels is normally provided with a brake lever for each wheel associated with stationary elements or flanges secured to the truck structure, with the brake levers being interconnected with the respective flange in a manner whereby the brake levers may be selectively repositioned. These brake levers are usually connected together by means of a screw type adjuster, as hereby set forth, with the associated disadvantages.

SUMMARY OF THE INVENTION

The present invention contemplates a novel slide bar type brake adjusting apparatus particularly designed and constructed for use with locomotive six wheel trucks, and the like, to overcome the above disadvantages. The novel slack adjuster comprises a housing structure having one end thereof adapted for connection with a brake lever, or the like. A slide bar extends non-rotatably but slidably into the housing and the outer end of the slide bar is adapted for connection with the adjacent brake lever, or the like. As the brake shoes become worn, or when it is necessary to adjust the brake cylinder piston travel for any reason, the slide bar may be quickly and easily pulled or pushed through the housing structure, depending upon the type of adjustment required. The movement of the slide bar pivots the brake lever or brake levers for repositioning the brake shoe with respect to the outer periphery of the wheel. When the brake shoe is properly adjusted, a keeper pin may be inserted through the slide bar and housing for securely retaining the slide bar in position and assuring an efficient holding of the brake shoe or brake shoes in the adjusted position thereof. When it is necessary to change or replace the brake shoe, the keeper pin may be removed from the housing and slide bar and the bar may be quickly and easily pulled through the housing structure for moving the brake lever or levers sufficiently to pull the brake shoe or shoes away from the wheel to a position wherein access to the brake shoes is readily provided. Upon replacement of the brake shoe, the slide bar may be pushed into or through the housing for moving the brake lever sufficiently for positioning the new brake shoe or shoes in the desired position with respect to the brake cylinder piston travel. The keeper pin may be replaced in the housing and slide bar for efficiently retaining the brake cylinder piston in the proper position, and a spring urged retainer lever may be placed over the keeper pin for retaining the keeper pin in position.

BRIEF DESCRIPTION OF THE DRAWINGS

FIG. 1 is a top view of a slack adjuster embodying the invention.

FIG. 2 is a sectional elevational view of a slack adjuster embodying the invention with portions depicted in elevation for purposes of illustration.

DESCRIPTION OF THE PREFERRED EMBODIMENT

Figure 3:
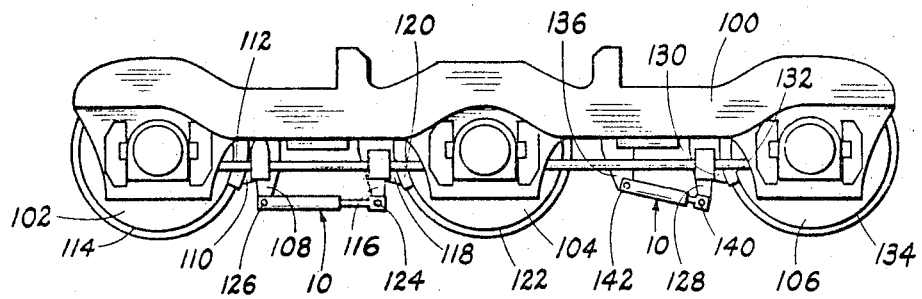
FIG. 3 is a side elevational view of one type of locomotive six wheel truck provided with slack adjuster device embodying the invention.

Referring to the drawings in detail, and particularly FIGS. 1 and 2, reference character 10 generally indicates a slack adjuster apparatus comprising a housing structure 12 having a slide bar apparatus 14 extending non-rotatably but slidably therein. The slide bar apparatus 14 comprises a substantially flat, elongated plate member 16 having a plurality of centrally disposed apertures 18 longitudinally spaced therealong. The outer end of the bar 16 is bifurcated, or provided with a pair of spaced longitudinally extending flanges 20 and 22 having substantially axially aligned apertures 24 and 26 provided therein for a purpose as will be hereinafter set forth. The flanges 20 and 22 are preferably disposed in mutually parallel planes which are perpendicularly oriented with planes which are perpendicularly oriented with respect to the plane of the bar 16. The flanges 20 and 22 may be integral with the plate 16, or may rigidly secured thereto, as desired.

The housing 12 as shown herein comprises a pair of mutually parallel plate members 28 and 30 spaced apart by a plurality of spaced cross members 32 whereby the general configuration of the housing 12 is similar to an open sided box. One end of the housing 12 is closed by a wall member 34, and the opposite end 36 thereof is open for a purpose as will be hereinafter set forth. A pair of spaced longitudinally extending flanges 38 and 40, similar to the flanges 20 and 22, are integral with or suitably rigidly secured to the wall 34 and extend outwardly therefrom in a direction away from the plates 28 and 30. The flanges 38 and 40 are preferably disposed in mutually parallel relationship and the planes of the flanges 38 and 40 are preferably substantially perpendicular to the planes of the plates 28 and 30. The flanges 38 and 40 are provided with aligned apertures 42 and 44, respectively, for a purpose as will be hereinafter set forth.

A plurality of apertures 46 are provided on the plate 28 and are preferably longitudinally spaced along the centerline thereof, as clearly shown in the drawings. A plurality of complementary apertures 48 are provided in the plate 30 in substantial axial alignement with the apertures 46. Whereas substantially any desired number of the apertures 46 and 48 may be provided, as particularly shown herein three apertures 46 and three apertures 48 are provided with a spacing of approximately 1⅞ inches between the centerlines of adjacent apertures, and the apertures 18 as shown herein may be spaced at approximately 1⅜ inches between the centerlines of adjacent apertures. There is no intention, however, of limiting the invention to any particular number or spacing between the apertures. The apertures 18 are particularly arranged for selective alignment between corresponding pairs of the apertures 46 and 48 during use of the apparatus 10 whereby a keeper pin 49 may be inserted therethrough for securing the slide bar 14 in a preselected position with respect to the housing 12.

A first substantially V-shaped outwardly extending flange 50 is provided on the plate 28 spaced slightly from the right hand aperture 46 as viewed in FIGS. 1 and 2. The apex of the V-shaped flange 50 is flattened or straightened as shown at 52 in FIG. 1, and is recessed to provide a groove 54. The outer extremities of the flange 50 are provided with outwardly extending stop members 56 and 58 for a purpose as will be hereinafter set forth.

A first keeper lever 60 is pivotally secured to the plate 28 in the proximity of the flange 50 and spaced on the opposite side thereof with respect to the apertures 46. The lever 60 may be pivotaLly secured to the plate 28 in any suitable manner, such as by a pivot shaft 62 secured to the plate 28 by a screw 64 and having a stop member 66 on the outer extremity thereof. A suitable helical spring 68 is disposed around the shaft 62 and interposed between the lever 60 and the stop member 66 for constantly urging the lever 60 into engagement with the outer surface of the plate 28. The lever 60 may be of any suitable configuration, and as shown herein comprises a main apertured plate portion 70 pivotally disposed around the shaft 62 and having a lever arm 72 extending outwardly and angularly therefrom in a direction generally toward the flange 50 for selective engagement therewith, as will be hereinafter set forth. The spring 68 constantly urges the plate 70 against the exposed edge of the flange 50.

A second substantially V-shaped outwardly extending flange 74 generally similar to the flange 50 is provided on the plate 28 spaced slightly from the left hand aperture 46, as viewed in FIGS. 1 and 2, and is preferably oppositely disposed with respect to the flange 50. The apex of the flange 74 is flattened or straightened in the same manner as the flange 50 and is recessed to provide a groove 76. The outer extremities of the flange 74 are provided with outwardly extending stop members 78 and 80 for a purpose as will be hereinafter set forth.

A second keeper lever 82 is pivotally secured to the plate 28 in the proximity of the flange 74 and spaced on the opposite side thereof with respect to the aperture 46. The lever 82 may be pivotally secured to the plate 28 in any suitable manner, such as by a pivot shaft 84 secured to the plate 28 by a screw 86 and having a stop member 88 on the outer extremity thereof. A suitable helical spring 90, similar to the spring 68, is disposed around the shaft 84 and interposed between the lever 82 and the stop member 88 for constantly urging the lever 82 into engagement with the outer surface of the plate 28. The lever 82 is preferably of a configuration generally similar to the lever 60 and comprises an apertured plate member 92 pivotally disposed around the shaft 84 and having a lever arm 94 extending outwardly and angularly therefrom in a direction generally toward the flange 74 for selective engagement therewith, as will be hereinafter set forth. The arm 72 of the keeper lever 60 is preferably of a length sufficient for reaching from the plate 70 to a position across the right hand aperture 46, as viewed in FIGS. 1 and 2, whereas the arm 94 is preferably of a length sufficient for reaching from the plate 92 to a position across the remaining two apertures 46. The spring 90 constantly urges the plate 92 against the exposed surface of the plate 28, and the arm 94 against the outer or exposed edge of the flange 74.

When the slide bar 14 is positioned at the desired orientation within the housing 12, the keeper pin 49 may be inserted through the apertures 46 and 48 which are aligned with one of the apertures 18, as clearly shown in FIGS. 1 and 2 for locking the slide bar 14 within the housing 12 until such time as it is necessary to alter the orientation therebetween.

In order to securely retain the keeper pin 49 in position within the aligned apertures 46, 48 and 18, the appropriate keeper lever, such as the lever 82, may be manually pivoted about the pivot shaft 84 by grasping the lever arm 94 and sliding the lever arm 94 along the upper edge of the flange 74 in a direction toward the recess 76. When the arm 94 is positioned in alignment with the recess 76, the force of the spring 90 will urge the arm 94 into the recess whereby the arm 94 will extend across the outer end of this stop member 88 and preclude accidental removal of the pin 49 from the engagement with the aligned apertures 46, 48 and 18. The spring 90 will function for securely retaining the arm 94 within the recess 76 until such time when it is desired to remove the pin 49 for any reason. In order to remove the arm 94 from its position against the stop member 88 of the pin 49, the arm 94 may be manually lifted against the force of the spring 90, thus lifting the arm 94 out of the recess 76. The arm 94 may then be disposed against the upper edge of the flange 74, and moved therealong until the arm 94 is away from the recess 76. Of course, the stop members 78 and 80 substantially preclude a complete disengagement of the arm 94 with the flange 74.

Referring now to FIG. 3, a locomotive six wheel truck with which the device 10 may be utilized is generally indicated at 100. The truck 100 as shown herein comprises three pairs of axially aligned wheels 102, 104 and 106 (only one wheel of each pair is shown in the drawings) and the pairs of wheels are in substantial longitudinal alignment whereby the pairs of wheels follow one another as the truck 100 moves along a railway (not shown). A first brake lever 108, commonly known as a live lever, has a first brakehead 110 and frictional-type brakeshoe 112 pivotally secured thereto intermediate the ends thereof in any suitable manner (not shown), and adapted for intermittent engagement with the cylindrical braking surface 114 of the wheel 102, as is well known. The live lever 108 is suitably connected with the usual piston rod (not shown) of the usual braking cylinder (not shown) normally provided on the locomotive truck 100 for actuation of the brakes. The lever 108 is normally carried by the truck 100 in such a manner whereby movement of the piston rod in one direction will pivot the lever 108 in a direction for moving the brakeshoe 112 into a braking engagement with the wheel-braking surface 114. Conversely, when the piston rod (not shown) moves in an opposite direction, the lever 108 will be actuated for moving the brakeshoe 112 away from or out of engagement with the braking surface 114.

A second brake lever 116 similar to the lever 108 has a second brakehead 118 and frictional-type brakeshoe 120 pivotally secured thereto intermediate the ends thereof in any suitable manner (not shown), and adapted for intermittent engagement with the cylindrical braking surface 122 of the wheel 104, as is well known. The lever 116 is suitably connected with the piston rod (not shown) of the braking cylinder (not shown) normally provided on the locomotive truck 100 for actuation of the brakes. The lever 116 is normally carried to the truck 100 in such a manner whereby movement of the piston rod in one direction will pivot the lever 116 in a direction for moving the brakeshoe 120 into a braking engagement with the wheel-braking surface 122. Conversely, when the piston rod (not shown) moves in an opposite direction, the lever 116 will be actuated for moving the brakeshoe 120 away from or out of engagement with the braking surface 122.

The device 10 is connected between the lower ends of the levers 108 and 116. As shown in FIG. 3, the brake lever 116 is pivotally secured to the flanges 20 and 22 of the slide bar 14 by a pivot pin 124 secured through lever 116 and the apertures 24 and 26, and the brake lever 108 is similarly pivotally secured to the flanges 38 and 40 of the housing 12 by a pivot pin 126 secured through the lever 108 and the apertures 42 and 44. The device 10 may thus be utilized in much the same manner as a turnbuckle for adjusting the position of the levers 108 and 116. The slide bar 14 is positioned within the housing 12 whereby the levers 108 and 116 will be properly positioned to cause the brakeshoes 112 and 120 to efficiently engage the braking surfaces 114 and 122, respectively. This is accomplished by manually moving the slide bar 14 with respect to the housing 12 until the proper spacing between the levers 108 and 116 is provided for achieving the desired position of the levers. When the levers 108 and 116 are at the preselected position thereof, the bar 16 is positioned in the housing 12 with the aperture 18 in the closest proximity of a set of apertures 46 and 48 in alignment therewith for receiving the keeper pin 49 therethrough. The spacing between the apertures 18 and the spacing between the apertures 46 and 48 are selected whereby it is possible to provide adjustment positions between the slide bar 16 and housing 12 at frequent intervals which as a practical matter is sufficient for brake adjusting devices of this type. When the pin 49 has been inserted through the aligned apertures 46, 18 and 48, the proper keeper lever, such as the lever 82, is actuated for engagement with the pin 49 as hereinbefore set forth in order to securely retain the pin 49 in position until such time as it is necessary to remove the pin.

When the piston rod (not shown) is actuated by the braking cylinders (not shown) for applying the brakes, as is well known, the live levers 108 and 116 are pivoted about the pivot connections 126 and 124, respectively, in directions for simultaneously moving the brakeshoes 112 and 120 against the braking surfaces 114 and 122. When the brakeshoes 112 and 120 have become worn, or it is necessary to adjust the position thereof for any reason for increasing the braking efficiency, the keeper pin 49 may be removed for releasing the slide bar 14 from engagement with the housing 12. The slide bar 14 may then be quickly and easily manually moved in the proper direction for adjusting the position of the levers 108 and 116 for providing the desired adjustment therefor. The slide bar 14 may again be secured within the housing 12 in the manner as hereinbefore set forth for securing the levers 108 and 116 in the selected position of adjustment.

Figure 4:
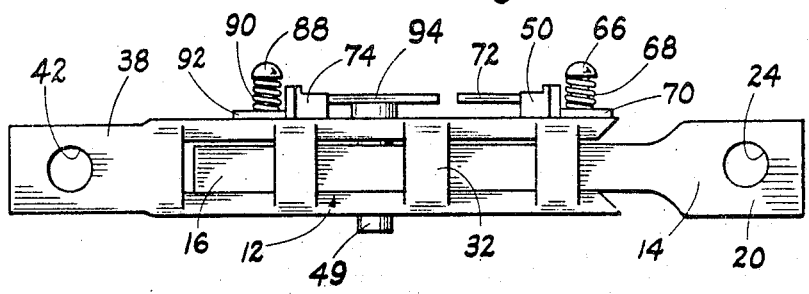
FIG. 4 is a side elevational view of a slack adjuster embodying the invention, and depicting one relative adjustment position thereof.
Figure 5:
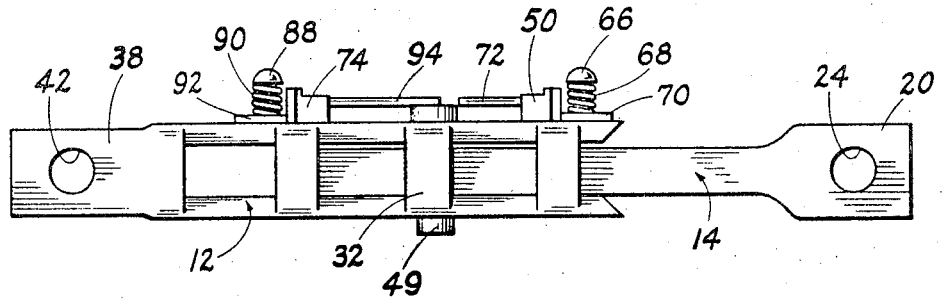
FIG. 5 is a view similar to FIG. 4 showing another relative adjustment position of a slack adjuster embodying the invention.
Figure 6:
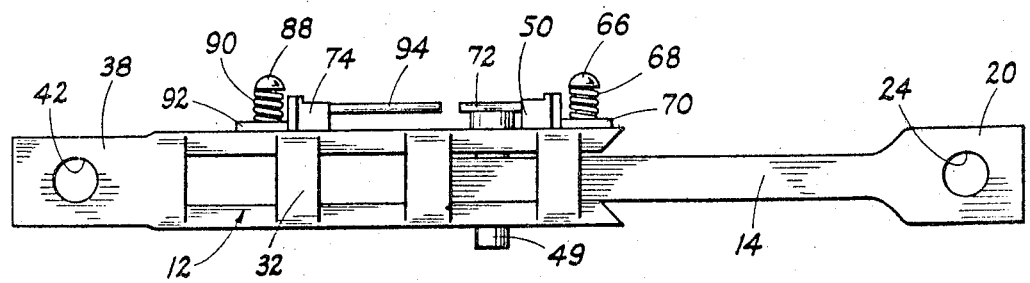
FIG. 6 is a view similar to FIGS. 4 and 5 and showing still another relative adjustment position of a slcak adjuster embodying the invention.

Referring particularly to FIGS. 4, 5 and 6, it will be apparent that substantially any desired position of adjustment between the levers 108 and 116 may be provided within the practical limits of the usual requirements thereof by the use of the slack adjustor device 10. For example, the pivot connections 124 and 126 of the levers 116 and 108, respectively, may be positioned at the closest proximity to each other by inserting the slide bar 14 fully into the housing 12, as shown in FIG. 4. The keeper pin 49 may be inserted through the particular apertures 46, 18 and 48 which may be aligned for maintaining the slide bar 14 securely fastened within the housing 12, and the keeper lever 82 may be positioned in such a manner that the arm 94 thereof is disposed adjacent the outer end of the pin 49. In order to adjust the position between the pivot connections 126 and 124 to a greater distance, the pin 49 may be removed, as hereinbefore set forth, and the slide bar 14 may be moved in a left hand direction, as viewed in the drawings, to an intermediate position within the housing 12 as shown in FIG. 5 for adjusting the position between the pivot connections as desired. The slide bar 14 may be locked in the housing 12 in the manner as hereinbefore set forth. In order to extend the distance between the pivot connections 126 and 124 to a maximum spacing, the slide bar 14 my be moved in a left hand direction as viewed in the drawings until the left hand aperture 18 is in alignement with the right hand apertures 46 and 48, as shown in FIG. 6, and the keeper pin 49 may be inserted through the algned apertures for locking the slide bar 14 in position. The keeper lever 60 may be orientated in such a manner that the arm 72 thereof is positioned against the exposed end of the pin 49 for precluding accidental disengagement of the pin from the apertures 46, 18 and 48.

Of course, when it is necessary to completely replace the brakeshoes 112 and 120, the keeper pin 49 may be removed from the apertures 46, 18 and 48, and the bar 14 may be pulled or removed from the housing 12 to completely disengage the slide bar 14 therefrom. The levers 108 and 116 may then be moved for moving the brakeheads 110 and 118 away from the wheels 102 and 104 to provide sufficient clearance for replacing the worn brakeshoes 112 and 120.

A third live brake lever 128 similar to the levers 108 and 116 is carried by the truck 100 in the proximity of the wheel 106 and has a third brakehead 130 and frictional type brakeshoe 132 pivotally secured thereto intermediate the ends thereof adapted for intermittent engagement with the cylindrical braking surface 134 of the wheel 106. The lever 128 is suitably connected with the piston rod (not shown) of the braking cylinder (not shown) as hereinbefore set forth. A flange or the like 136 is rigidly secured to the truck 100 in any suitable manner (not shown) and spaced from the lever 128 as particularly shown in FIG. 3. The device 10 is connected between the levers 128 and the flange 136 in any suitable manner, and as shown herein one end of the lever 128 is pivotally connected to the flanges 20 and 22 of the slide bar 14 by a pivot pin 140, and the flange 136 is pivotally connected with the flanges 38 and 40 of the housing 12 by a pivot pin 142. The device 10 may be utilized in the manner as hereinbefore set forth for adjusting the position of the lever 128 to assure an efficient braking action.

From the foregoing it will be apparent that the present invention provides a novel slack adjuster for locomotive brakes wherein the brakes may be quickly and easily adjusted by manual reciprocation of a slide bar having at least one end operably connected with a brake lever and functioning in much the same manner as a turnbuckle, but through a sliding operation. The novel slack adjuster comprises a slide bar telescopically arranged with respect to a housing member, and having means for securing the slide bar within the housing as selected relative positions therebetween. The novel slack adjuster is simple and efficient in operation and economical and durable in construction.

Whereas the present invention has been described in particular relation to the drawings attached hereto, it should be understood that other and further modifications, apart from those shown or suggested herein, may be made within tbe spirit and scope of this invention.

I claim:

1. In combination with a locomotive six wheel truck having a brake apparatus including brake levers, a slack adjuster device operably connected with the brake levers and comprising an elongated housing having spaced upper and lower elongated plates disposed in mutually parallel planes, a slidable non-rotatable bar extending into the housing between the plates, means cooperating with the housing and slidable bar for securing the slide bar means at substantially any desired position with respect to the housing, and means provided on the housing and slidable bar for securing the device to the brake levers for adjusting the position thereof in accordance with the relative position between the housing and the slidable bar.

2. In combination with a locomotive six wheel truck, a slack adjuster device as set forth in claim 1 wherein a plurality of spaced cross members are secured between the plate members providing an open-type box construction, one end of said box being open for receiving the slidable bar therethrough, the opposite end of said box being provided with apertured means for facilitating securing of the device to the brake levers.

3. In combination with a locomotive six wheel truck, a slack adjuster device as set forth in claim 1 wherein the slidable bar comprises an elongated substantially flat bar having apertures means provided on one end thereof for facilitating securing of the device to the brake levers.

4. In combination with a locomotive six wheel truck, a slack adjuster device as set forth in claim 1 wherein the means for securing the slide bar to the housing comprises first apertured means provided in the plate members of the housing, second apertures means provided in the slidable bar and adapted for selective alignment with the first apertured means, keeper pin means engagable with the aligned apertured means for securing the slidable bar in a preselected position within the housing, and keeper lever means carried by the housing and selectively engagable with the keeper pin means for retaining the pin within the aligned apertures.

5. In combination with a locomotive six wheel truck having a brake apparatus including brake levers, a slack adjuster device operably connected with at least one brake lever for facilitating adjustment thereof and comprising a housing comprising a pair of mutually parallel longitudinally extending plate members, a plurality of spaced cross members secured between the opposite sides of the plate members for spacing thereof in a transverse direction, one end of said housing being open and the opposite end thereof being closed, said plate members each being provided with longitudinally spaced apertures in axial alignment with the corresponding apertures in the other plate, an elongated substantially flat bar member extending longitudinally into the housing through the open end thereof and slidably disposed therein, said flat bar member being provided with a plurality of longitudinal spaced apertures for selective alignment with a preselected pair of aligned apertures of the plate members, and means cooperating with the apertures of plate members and bar for securing the bar in the housing in preselected relative position therebetween.

* * * * *